Sept. 3, 1940.  F. H. WAGNER, JR  2,213,421
EVAPORATIVE COOLING SYSTEM
Filed June 16, 1937
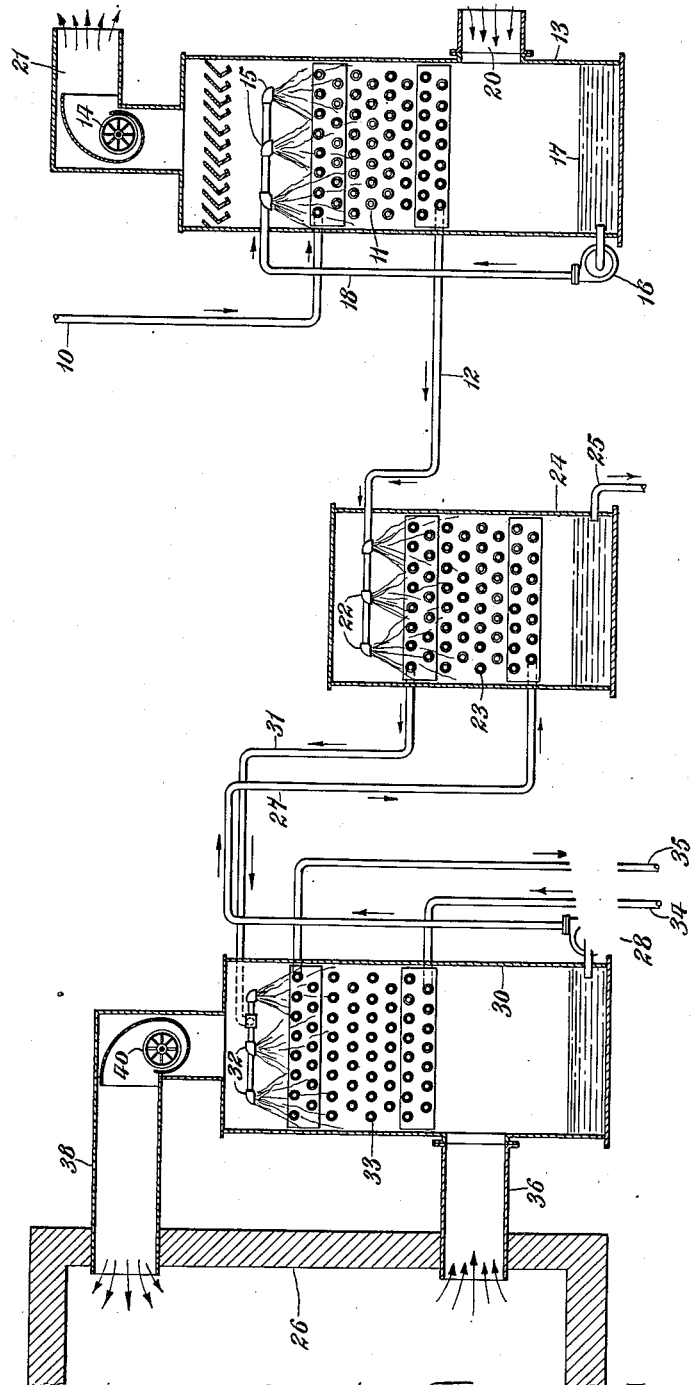
Fred H. Wagner, Jr. Inventor
by Popp & Popp Attorneys Patented Sept. 3, 1940

2,213,421

UNITED STATES PATENT OFFICE 2,213,421

EVAPORATIVE COOLING SYSTEM

Fred H. Wagner, Jr., New York, N. Y., assignor to Niagara Blower Company, New York, N. Y., a Corporation of New York Application June 16, 1937, Serial No. 148,503

1 Claim. (Cl. 62—128)

This invention relates to an evaporative cooling system, and more particularly to a system for cooling a fluid foodstuff such as milk.

It has heretofore been the practice in cooling milk coming to a creamery to provide mechanical refrigeration for reducing the temperature of the milk to the point desired and maintaining the temperature of the cooling room in which the milk is stored at the desired temperature.

It is the principal object of this invention to effect an economy in such mechanical refrigeration by first passing the milk through the tubes of an evaporative cooler over which water and air are passed, the milk thereby being reduced in temperature to a point near the wet bulb temperature of the air passing through the evaporative cooler. In accordance with the invention the milk is then subjected to cooling by mechanical refrigeration in a system which also preferably includes means for cooling and maintaining a high relative humidity in the milk holding room. By removing the greater part of the heat from the milk through evaporative cooling, a very substantial saving in the cost of refrigeration results and by passing the milk directly and initially through the tubes of an evaporative cooler the highest efficiency in cooling the milk by evaporative cooling is obtained.

Another object of the present invention is to provide a simple and efficient means for rapidly cooling the milk, after its cooling in the evaporative cooler, by spraying it over tubes through which a cooling medium is passed. By effecting the final cooling of the milk in this manner a high efficiency in heat transfer is obtained and large quantities of milk can be cooled in a cooler having a comparatively small amount of cooling surface.

Another object of the invention is to provide in the milk cooling system means for cooling and humidifying the air in the milk holding room, the air in the holding room being cooled by passing it through a spray cooler in which the water medium for the milk cooler is also sprayed.

Another object of the invention is to effect these results without contaminating the milk and with an apparatus which is extremely simple in construction and operation and consists of few moving parts.

In the accompanying drawing, the figure is a diagrammatic vertical section through a cooling system embodying my invention.

The milk or other fluid foodstuff to be cooled and stored is pumped in from a source of supply through a supply pipe 10 and forced through a cooling coil 11 and out through a transfer line 12. The cooling coil 11 is arranged in the casing 13 of an evaporative cooler through which fresh air is passed in an upward direction by means of a blower 14. The coils 11 within the evaporative cooler are sprayed from a plurality of spray jets 15 supplied with water from a pump 16 which draws the water from a sump 17 at the bottom of the casing 13 and recirculates it through a pipe 18 and the spray nozzle 15. It will be understood that the water in the sump 17 is replaced in any usual and well known manner as evaporation takes place. The fresh air is introduced through an air inlet duct 20 and discharged in a saturated condition through the outlet duct 21. This saturation of the air is effected by evaporation of the water sprayed against the coil 11 and it will be understood that by this means the temperature of the milk passing through the coil can be reduced to a temperature closely approaching the wet bulb temperature of the fresh air entering the duct 20, the water recirculated by the pump 16 likewise assuming this same temperature.

After the milk has been precooled in the cooling coil 11 it is forced through the transfer pipe 12 to spray nozzles 22 which spray the milk against a cooling coil 23 of a milk cooler. This milk cooler includes a casing 24 which completely encloses the coil 23 and also the spray nozzles 30 so that contamination of the milk sprayed over the cooling coil 23 is prevented. The milk, cooled to the desired temperature by being sprayed over the cooling coil 23, collects in the bottom of the milk cooler from which it can be withdrawn by means of an outlet pipe 25 for storage in the milk holding room 26.

The cooling medium supplied to the cooling coil 23 can be sweet water or may be water having any suitable anti-freeze, such as salt, propylene glycol or the like and is introduced through the inlet line 27 to the coil 23 by a pump 28 which has its inlet connected to the sump at the bottom of the casing 30 of a spray cooler. From the coil 23 the water passes through a pipe 31 and is discharged through nozzles 32 located in the upper end of the casing 30 against a refrigerating coil 33. This refrigerating coil 33 is preferably supplied with a refrigerating medium which is expanded in this coil, such direct expanding refrigerating medium being of any well known form, such as ammonia, Freon, ethyl chloride and the like. The refrigerant is supplied to the coil 33 from a supply pipe 34 and the expanded gas is withdrawn from this coil through an outlet line 35. It will be understood that the lines 34 and 35 can be connected with the conventional compressor and condenser of a refrigerating system.

In order to cool and humidify the air within the milk holding room 26, air is withdrawn from this milk holding room through a duct 36 and drawn upwardly through the casing and redischarged through a duct 38 back to the milk holding room by a blower 40. Since the air delivered by the blower 40 and the spray water collecting at the bottom of the casing 30 will be at the same temperature the milk delivered to the milk holding room from the pipe 25 will be at approximately the same temperature as the atmosphere in the milk holding room. It will be understood that any suitable well known control can be employed for adjusting this temperature as may be desired. It will also be noted that since the air from the milk holding room is drawn past the water spray nozzles 32 it will be substantially saturated so that the atmosphere in the milk cooling room is not only maintained at subsantially the same temperature as that to which the milk is cooled but is also maintained close to a saturated condition.

As an example of the operation of the system it will be assumed that the milk supplied is at 143° F. and that it is desired to cool this milk and to maintain the temperature of the milk holding room 26 at from 38 to 40° F. It will also be assumed that the outside air has a wet bulb temperature of 75° F.

The milk entering the coil 11 of the evaporative cooler at 143° F. will be cooled to approximately 83° F. with the assumed 75° F. wet bulb temperature of the air entering the duct 20, this air evaporating the water sprayed and recirculated over the coils 11 from the nozzles 15. Since the spray nozzles 15 spray directly against the coils 11 a high rate of heat transfer obtains and by the provision of an adequate amount of surface the temperature of the milk passing through these coils can be reduced to a point close to the wet bulb temperature of the fresh air. This air is discharged in a substantially saturated condition through the duct 21.

The milk at 83° F. is then discharged by the spray nozzles 22 against the cooling coil 23. The cooling water supplied to this cooling coil through the pipe 27 would, under the conditions outlined, be supplied at a temperature of 34° F. and would leave through the line 31 at a temperature of 57.5° F. The milk sprayed over the cooling coil 23 passes countercurrent to the cooling water passing through this coil and would be cooled to approximately 38° F., leaving through the line 25 at this temperature.

The cooling water from the return pipe 31 and at a temperature of 57.5° F. is sprayed by the nozzles 32 over the refrigerating coil 33 in which ammonia or the like is expanded. This coil 33 is controlled to cool this water to approximately 34° F., the water at this temperature collecting in the bottom of the casing 30 and being delivered at approximately the same temperature by the pump 28 to the cooling coil 23. The air delivered through the duct 38 would be at the same temperature of 34° F. and hence the milk holding room 26 to which the cold milk from the pipe 25 is delivered would be maintained at a temperature of from 38 to 40° F., returning through the air duct 36 at this temperature. The actual temperature of the milk cooling room 26 would depend, of course, upon various heat absorbing factors.

From the foregoing example it will be seen that the greater amount of the sensible heat of the milk is removed by passing it through the coil 11 of the evaporative cooler and that the only power necessary to operate this cooler is the blower 14 for drawing fresh air through the evaporative cooler and the pump 16 for recirculating the spray water. This initial precooling of the milk in an evaporative cooler greatly reduces the amount of refrigeration necessary to lower the temperature of the milk to the assumed desired 38° F. From this evaporative cooler the temperature of the milk is rapidly reduced to the desired temperature by spraying it over a cooling coil within an enclosed milk cooler. At the same time the cooling water supplied to this coil is also employed to humidify the air in the milk holding room 26 and since this cooling water is sprayed directly over a refrigerating coil located in the same casing through which the air to the holding room is passed, the cooling water and this air are cooled to the same temperature in a simple and effective manner and the temperature of both can be easily controlled by regulating the direct expanded refrigerant supplied to the refrigerating coil.

I claim as my invention:

An evaporative cooling system for a fluid foodstuff, comprising an evaporative cooling coil, means for forcing said fluid foodstuff through the interior of said cooling coil, means for moistening the outer surfaces of said cooling coil, means for passing a current of atmospheric air over said outer surfaces of said cooling coil, a heat exchanger, means for removing the fluid foodstuff from said cooling coil and passing it through said heat exchanger, a storage room for said fluid foodstuff after being so cooled, means for passing a cooling liquid through said heat exchanger and contacting said liquid with the air in said storage room to cool the air in said storage room, and means for cooling said intermediate liquid.

FRED H. WAGNER, Jr.